G. G. MILNE.
CAR LIGHTING GENERATOR DRIVE MECHANISM.
APPLICATION FILED JULY 3, 1918.

1,369,292. Patented Feb. 22, 1921.

George G. Milne, Inventor
By his Attorneys Kenyon & Kenyon

UNITED STATES PATENT OFFICE.

GEORGE G. MILNE, OF RYE, NEW YORK, ASSIGNOR TO THE HUMIL CORPORATION, A CORPORATION OF NEW YORK.

CAR-LIGHTING GENERATOR-DRIVE MECHANISM.

1,369,292.

Specification of Letters Patent.    Patented Feb. 22, 1921.

Application filed July 3, 1918. Serial No. 243,110.

*To all whom it may concern:*

Be it known that I, GEORGE G. MILNE, a citizen of the United States, and a resident of Rye, county of Westchester, and State of New York, have invented certain new and useful Improvements in Car-Lighting Generator-Drive Mechanism, of which the following is a specification.

My invention relates to the axle train lighting art and is particularly directed to the driving of the generator for such lighting equipments.

It is an object of my invention to simplify the driving arrangement and to eliminate as much as possible all elements which tend to cause disruption of surface and trouble and annoyances of various kinds. My invention is particularly directed to the form of drive in which a worm gear is used.

One embodiment of my invention is shown in the accompanying drawings forming a part of this specification and in which—

Figure 1:
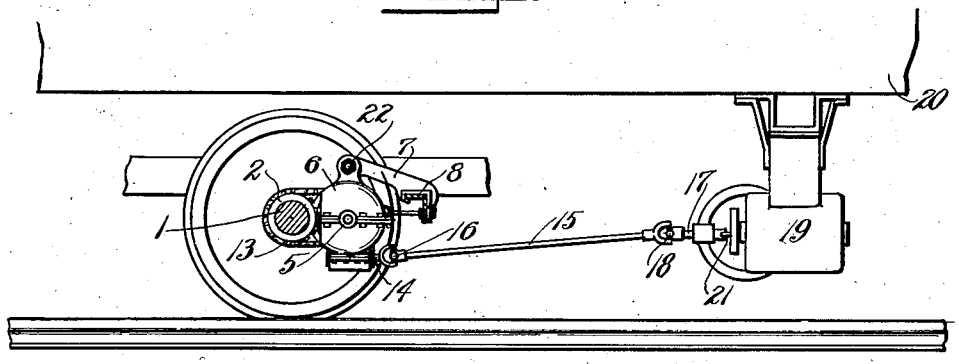
Figure 1 represents a side view of a constructon illustrating my invention.
Figure 2:
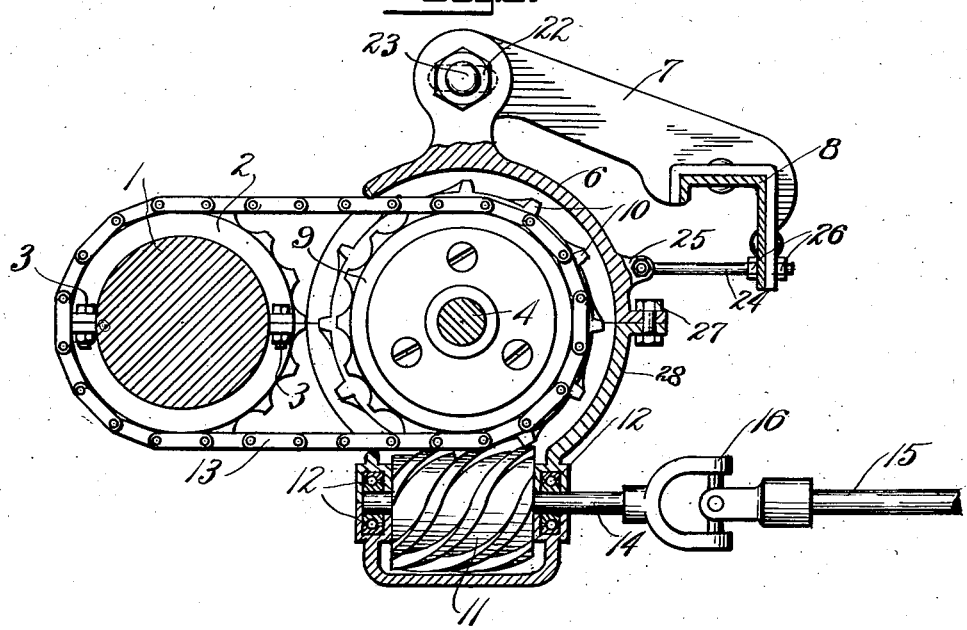
Fig. 2 shows an enlarged sectional view showing the parts more in detail.

The arrangement consists of the car axle 1 on which is fastened a split sprocket 2. The parts of the sprocket are held together by bolts 3. Arranged parallel to the axle 1 is a shaft 4. This shaft is supported by bearings 5 in a casing 6. The casing in turn is supported by means of a bracket 7 attached as by riveting to one of the truck members 8 of the car. Mounted on the shaft 4 is a sprocket 9 and a worm gear 10. Mounted in the lower part of the casing 6 is a worm 11 supported in ball-bearings 12. The worm 11 and worm gear 10 are in mesh so that the worm 11 is driven by the gear 10. Passing over the sprockets 2 and 9 is a chain 13 so that as the axle rotates the worm gear 10 is driven through the chain 13 and in turn drives the worm 11 which is mounted on the shaft 14. This shaft 14 is connected with a drive shaft 15 by means of a universal joint 16. The drive shaft 15 in turn is connected with a shaft 17 through a universal joint 18. The shaft 17 drives the armature of a generator 19 which is attached by any suitable means to the body of a car 20. Between the armature of the generator 19 and the shaft 17 is a slidable connection 21 permitting a relative longitudinal movement of these members.

The casing 6 is supported from the bracket 7 so that the shaft 4 hangs substantially vertical under the point of support of the casing. There is a slotted hole 22 in the bracket 7 through which the supporting member 23 of the casing passes. The tension on the chain 13 may be adjusted by means of the rod 24 which passes through the truck member 8 or any suitable member attached thereto, such as the member 7. The rod 24 is pivotally connected to a lug 25 on the casing 6 and is screw-threaded at its outer end and provided with nuts 26 for the purpose of adjustment. The parts of the casing are held together by means of bolts 27. The lower end of the casing is provided with a detachable section 28 which renders the worm and worm gear accessible without removing the other parts of the casing.

From the foregoing, the operation of the apparatus will be evident and briefly, the driving force is the axle 1 through which force is transmitted to the sprocket 2, chain 13, sprocket 9, worm gear 10, worm 11 and shaft 15 to the armature of the generator 19.

It will be seen that the apparatus above described is extremely simple and may be attached to a car without adding any substantial amount of apparatus to the axle, the only thing on the axle being the sprocket 2. All of the other parts of the driving apparatus are supported from a truck member 8. This arrangement makes the application of the arrangement to a truck a very simple matter and permits it to be done with a minimum of expense and labor; likewise the same may be readily repaired.

Having fully described my invention, what I claim as new and desire to secure by Letters Patent is:

1. In a device of the character described, the combination of a shaft, a worm connected therewith, a counter shaft at right angles to the first shaft, a gear on the counter shaft meshing with said worm gear, a casing covering said gears, means pivotally supporting said casing, a sprocket on said counter shaft, a car axle, a sprocket on the car axle and flexible means connecting said sprockets.

2. In a device of the character described, the combination of a shaft, a worm connected therewith, a counter shaft at right angles to the first shaft, a gear on the counter shaft meshing with said worm gear, a casing covering said gears, means pivotally supporting said casing, a sprocket on said counter shaft, a car axle, a sprocket on the car axle and flexible means connecting said sprockets, the pivot point of said casing being such that gravity causes tension on said flexible means between the sprockets.

In testimony whereof, I have signed my name to this specification.

GEORGE G. MILNE.